July 29, 1941.   H. G. ADLER   2,250,984
GOVERNOR
Filed May 6, 1940   2 Sheets-Sheet 1
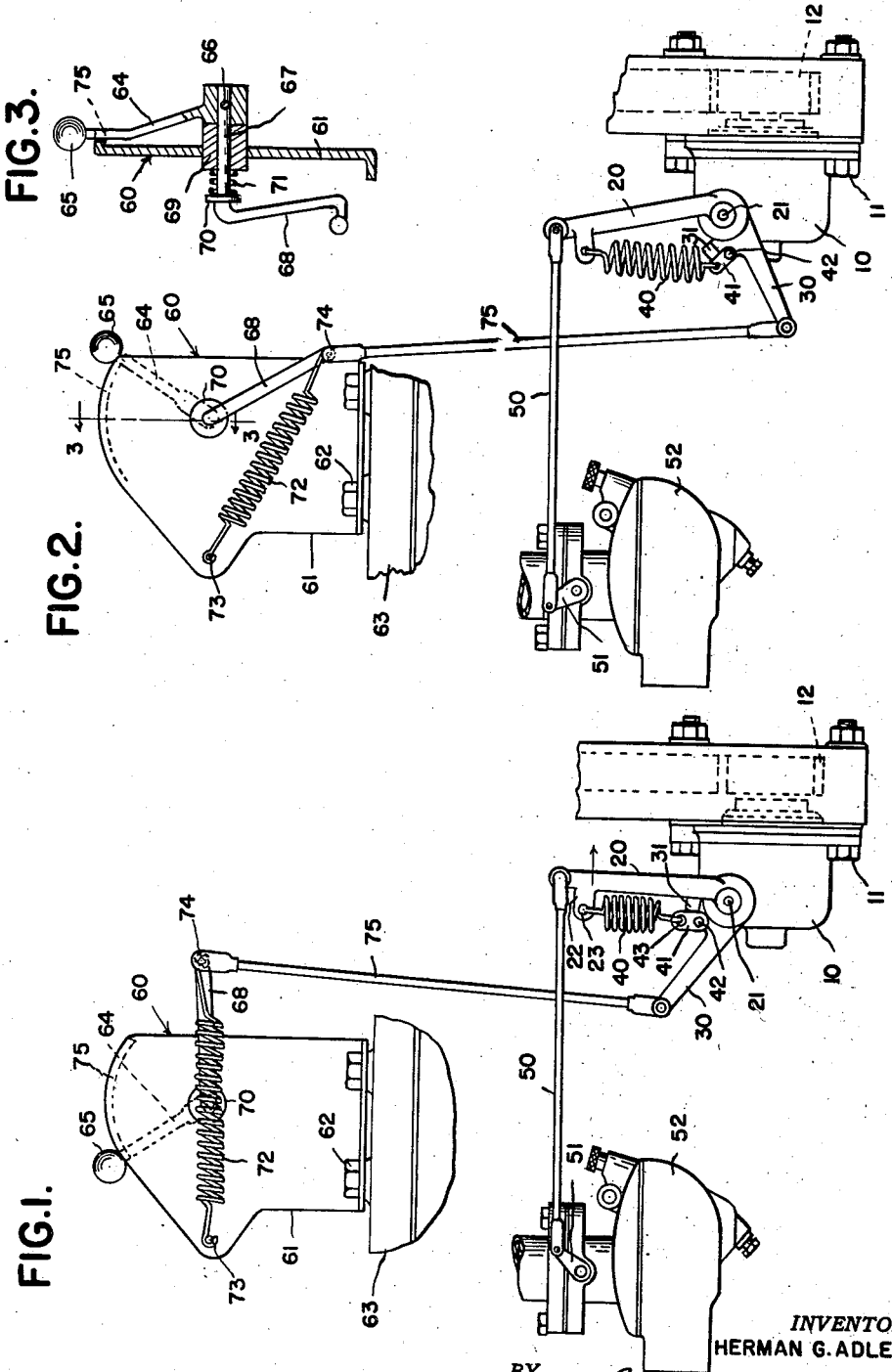
INVENTOR.
HERMAN G. ADLER
BY
ATTORNEYS July 29, 1941.  H. G. ADLER  2,250,984
GOVERNOR
Filed May 6, 1940  2 Sheets-Sheet 2

INVENTOR.
HERMAN G. ADLER
BY
ATTORNEYS

Patented July 29, 1941

2,250,984

UNITED STATES PATENT OFFICE 2,250,984

GOVERNOR

Herman G. Adler, Detroit, Mich., assignor to Novi Equipment Company, Novi, Mich., a corporation of Michigan Application May 6, 1940, Serial No. 333,656

7 Claims. (Cl. 264—3)

The present invention relates to governors and more particularly to a governor adapted to control engine speed throughout an extremely wide range, in combination with manual setting means for setting the governor to operate at any desired speed.

Centrifugal governors of this type include centrifugal mechanism, such for example as balls, weights, or the like, which are adapted to be rotated and to assume various positions of outward adjustment in accordance with the speed of their rotation and the initial setting of the governor.

Balancing means are provided which oppose the outward movement of the centrifugal elements, the balancing means being so arranged that during constant velocity operation the force developed by the balancing means exactly equals the force developed by the centrifugal elements.

It will be apparent that in a governor adapted to control the speed of an engine throughout an extremely wide range, the balancing forces will vary between correspondingly wide ranges for the reason that the centrifugal force varies as the square of the velocity. Since the centrifugal force developed is throughout the operation balanced or substantially balanced by the force of the balancing means, it follows that the balancing means themselves are subjected to forces which vary through a correspondingly wide range.

In the present device it is desired to provide manual means for setting the balancing means to control at any desired speed, and further it is desired that these manual means shall be movable readily to various positions without the exercise of force comparable to the balancing force exerted.

More specifically it is an object of the present invention to provide a manual setting means for a wide range governor which comprises a lever movable between extreme positions upon the application of a minimum of manual force. At the same time it is desired that this manual adjusting lever may be retained in adjusted position, although the balancing force exerted through the balancing mechanism thus set shall vary through a wide range.

It is a further object of the present invention to provide balancing means for a centrifugal governor comprising a lever connected to the governor balancing mechanism in combination with spring means adapted to substantially counterbalance the torque of the governor balancing means on said manual adjusting lever.

It is a further object of the invention to provide a manual adjusting lever for setting the balancing means of a centrifugal governor, in combination with spring balancing means acting on the lever to counterbalance the torque of the balancing means thereon, and adapted at idle speed to apply a torque to the adjusting lever in the same direction as the torque applied thereto by the governor balancing means.

Other objects of the invention will be apparent as the description proceeds, and when taken in conjunction with the accompanying drawings, wherein:

Figure 1 is a side elevation of a governor carburetor and manual adjusting station;

Figure 2 is a view similar to Figure 1 with the manual adjusting lever moved to high speed position;

Figure 3 is a fragmentary section on the line 3—3, Figure 2;

Figure 5:
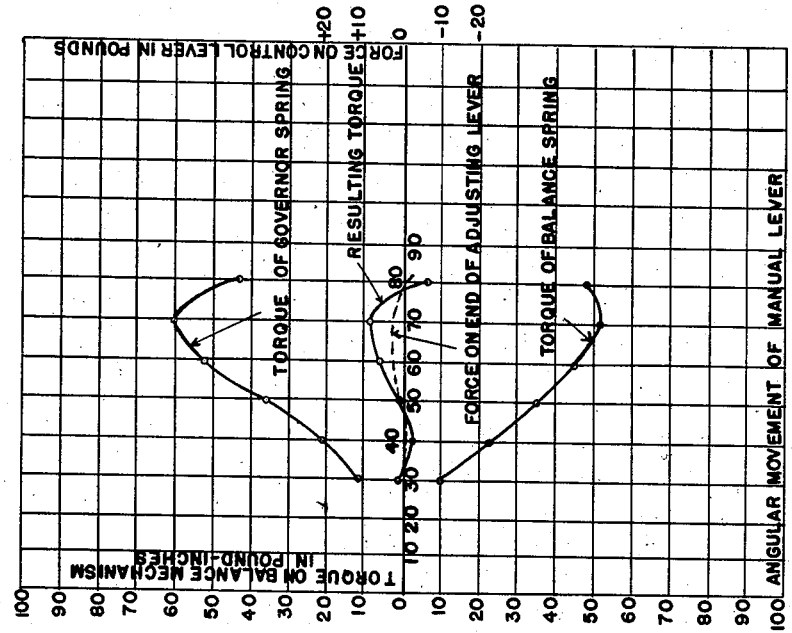
Figure 5 is a chart showing torque curves of the governor, the balance spring, and the resultant torque on the adjusting lever.

Referring to Figure 1, I have indicated at 10 a governor of the centrifugal type which is bolted or otherwise secured as indicated at 11 to a suitable supporting structure, such for example as a portion of an internal combustion engine. Centrifugal means are included within the governor 10 and are adapted to be rotated through the medium of a drive gear 12 connected to a rotating part of the engine. A control lever 20 is pivoted to the governor casing as indicated at 21, and has a portion extending within the casing and cooperating with the centrifugal means.

While in the present case the specific nature of the centrifugal means is unimportant, it may be stated that by way of example the centrifugal means may be such as is shown in my copending application Serial No. 257,557, filed Feb. 20, 1939, and this may be briefly described in the present case as comprising a plurality of balls received between a pair of axially movable plates, the plates being shaped to provide an outwardly constricted space therebetween so that as the balls move outwardly as result of the centrifugal force the plates are separated, and this relative motion of the plates is transmitted to the portion of the control lever 20 which extends within the casing. The centrifugal force developed by the balls therefore tends to rotate the lever 20 in the direction of the arrow shown in Figure 1.

Associated with the casing of the governor 10, and preferably pivoted concentrically with the lever 20, is an adjusting lever 30. Resilient means including a tension spring 40 and a rigid link 41 interconnect levers 20 and 30. For this purpose the lever 20 is provided with a laterally extending arm 22 having an eye 23 therein for the reception of one end of the spring 40. The link 41 is pivoted to a stud 42 on the adjusting lever 30, and at its opposite end has an eye 43 for receiving the opposite end of the spring 40. As will be evident, the spring 40 tends to swing levers 20 and 30 together, and assuming the lever 30 to be retained in adjusted position the resilient means tends to rock the lever 20 in a counterclockwise direction as seen in Figure 1. This direction is opposite to the direction which the centrifugal means tends to pivot the lever 20, with the result that the torque of the spring 40 on the lever 20 tends to balance the torque of the centrifugal means thereon.

The lever 30 is formed with a projection 31 which is adapted to engage the link 41 to prevent further swinging of the link about the stud 42. This condition is well illustrated in Figure 2, in which it will be observed that the link 41 has engaged the projection 31, with the result that both the extension of the spring 40 and the effective torque arm of the spring for rotating the lever 20 in a counterclockwise direction is substantially greater than it would be if the link 41 and abutment 31 were omitted. In like manner it will be evident that the torque between arms 20 and 30 in Figure 2 is many times greater than the torque existing under the conditions illustrated in Figure 1.

The control lever 20 is connected by a suitable link 50 to a lever 51, which in turn is connected to the throttle of an internal combustion engine, the carburetor of which is indicated generally at 52. Accordingly, as the lever 20 is rocked about its axis 21 the throttle is moved to corresponding positions of adjustment.

I have indicated generally at 60 means for moving the adjusting lever 30 to various positions of adjustment in accordance with the desired speed of the internal combustion engine. This means comprises, in the illustrated embodiment, a bracket plate 61 bolted or otherwise secured as indicated at 62 to an appropriate support 63. In the event that this invention is applied to a tractor, the means 60 will preferably be located convenient to the drive station. The adjusting means comprises a lever 64 having a knob or ball 65 thereon to be grasped by the operator. The lever 64, as indicated in Figure 3 at 66, is keyed or otherwise secured to a shaft portion 67 of a manual lever 68, so that in effect the levers 64 and 68 become a unitary member. The plate 61 is apertured and has received therein in fixed position a bushing 69 through which the shaft portion 67 of the manual lever 68 extends. I have indicated at 70 a collar on the lever 68 against which is adapted to abut a compression spring 71, the other end of which is seated against the bushing 69. As will be evident, the compression spring 71 urges the lever assembly to the left, as viewed in Figure 3, thus urging the sleeve of lever 64 into frictional engagement with bushing 69.

Adjacent the upper edge of the plate 61 I preferably provide a serrated laterally extending flange 75, and the compression spring 71 tends to move the upper portion of the lever 68 into depressions in this serrated flange. This tends to retain the lever assembly in adjusted position, and in addition the resistance thus providing against turning of the lever 64 tends to cover up or conceal any slight differences in torque applied thereto by the balancing means of the governor and the balance spring 72.

The balance spring 72 is a tension spring which is secured at one end to a stud or the like 73 carried by the plate 60. The opposite end of the spring 72 is connected to the free end of the lever 68 as indicated at 74. The free end of the lever 68 is also connected as by means of a link 75 to the adjusting lever 30 of the governor.

Preferably the parts are so arranged that the spring 72 has an over-center relationship with the lever 68. As will be observed in Figure 1, which illustrates the parts in "idle" position, the spring 72 and the spring 40 both tend to swing the lever 68 in a counter-clockwise direction. On the other hand, when the lever 64 is swung in a clockwise direction away from idle position, tension of the spring 72 opposes tension of the spring 40, and the parts are constructed and arranged so that the torques of the two springs, when considered with respect to the manual lever 68, are substantially balanced. It will be observed that as the lever 68 is swung in a clockwise direction the elongation of the spring decreases, but at the same time its effective torque arm with respect to the lever 68 increases.

Figure 4:
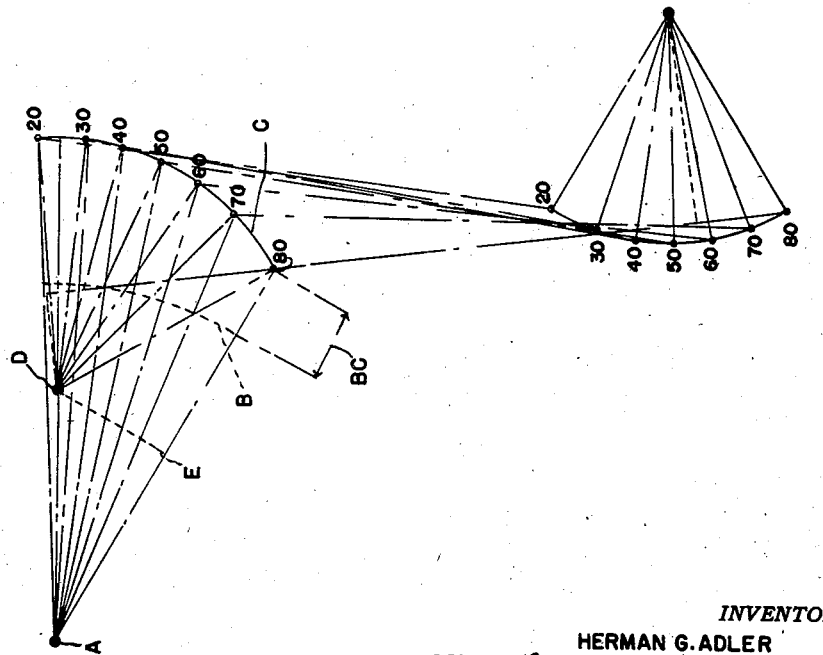
Figure 4 is a diagram of the force and lever arms developed.

Referring now to Figure 4, I have illustrated the above mentioned conditions. In this figure the point A indicates the point of connection 73 of the spring 72 to the plate 61. The curve B is an arc traced by the opposite end of the spring 72 in normal or untensioned condition. In other words the distance AB is the normal length of the spring 72. The curve C indicates the path through which the opposite end of the spring 72 swings during movement of the levers 64 and 68. Therefore the distance between the curves B and C, as measured along any line passing through the point A, is a measure of the elongation of the spring 72, this distance being indicated at BC when the lever arm is swung to the position designated 80. I have indicated at D the axis of the shaft portion 67, and the effective torque arm of the spring 72 at any position of adjustment is the normal distance from the point D to the line of action of the spring, being a distance DE when the lever arm is in the position designated 80.

The governor curve, of course, depends upon the design of the governor, but it will be recalled that this governor curve must be balanced by the torque developed by the governor spring 40. In Figure 5 I have indicated a typical curve representing the torque of the governor spring as applied through link 75 to manual lever 68, and also a correspondingly plotted curve representing the torque of the balancing spring 72. It will be evident that where these torques are balanced there will be no torque applied to the lever 64, and the same may be manually controlled without overcoming force other than frictional resistance, and particularly the frictional resistance due to the arrangement of the spring 71 previously described. A typical example is indicated in Figure 5. The torques of the governor spring and balance spring are compared to give a resultant torque effective on the lever 64. In dotted lines in Figure 5 I have indicated a curve representing the actual force applied as a result of these generally opposing torques on the end of the adjusting lever 64. It will be observed that this force never exceeds a very few pounds, although the maximum torque of the governor spring in the embodiment charted amounts to 60 pounds-inches. Preferably the friction developed by the spring 71 and the serrated flange 75 is greater than this amount so that the lever 64 will remain in any position of adjustment.

It will be observed that it would be impossible to apply a balancing spring directly to the lever 30 to oppose the torque exerted thereon by the governor spring 40, but that by the present arrangement I substantially counterbalance the torque of the governor spring 40 on the levers 64 and 68.

It may be observed that in the past difficulty has been encountered in providing means for setting the governor, for the reason that where these means are subjected to widely varying unbalanced torques, vibration of the equipment oftentimes causes the adjusting lever to be moved away from retaining ratchet surfaces or the like, with the result that the adjusting lever swings in a clockwise direction to extreme position. With the present arrangement this is entirely avoided. Furthermore, while the manual lever tends to remain in any position of adjustment it may be easily moved to any other position of adjustment upon the application of a relatively insignificant force.

While I have indicated but one form of my device, it will be understood that the same has been illustrated and described in detail so that those skilled in the art may practice the invention the scope of which is indicated by the appended claims.

What I claim as my invention is:

1. In a wide range governor having a movable adjusting member subjected at increased speed settings of said governor to continuously increasing effort, means for moving said adjusting member comprising a lever and a link interconnecting said lever and said member and constructed and arranged to change said continuously increasing effort as applied to said member to a torque applied to said lever which first increases and then decreases upon movement of said lever from slow to high speed positions, and spring means connected to said lever adapted substantially to balance said torque in all positions of adjustment.

2. In a wide range governor having an adjusting lever subjected at increased speed settings of said governor to continuously increasing torque, means for moving said lever comprising a manual lever and a link interconnecting said levers and constructed and arranged to change said continuously increasing torque as applied to said first lever to a torque applied to said second lever which first increases and then decreases upon movement of said second lever from slow to high speed positions, and spring means connected to said second lever adapted substantially to balance said torque in all positions of adjustment.

3. In a wide range governor having an adjusting lever subjected at increased speed settings of said governor to continuously increasing torque, means for moving said lever comprising a manual lever and a link interconnecting said levers and constructed and arranged to change said continuously increasing torque as applied to said first lever to a torque applied to said second lever which first increases and then decreases upon movement of said second lever from slow to high speed positions, spring means connected to said second lever adapted substantially to balance said torque in all positions of adjustment, and frictional means opposing manual movement of said manual lever.

4. In a wide range governor having an adjusting lever subjected at increased speed settings of said governor to continuously increasing torque, means for moving said lever comprising a manual lever and a link interconnecting said levers and constructed and arranged to change said continuously increasing torque as applied to said first lever to a torque applied to said second lever which first increases and then decreases upon movement of said second lever from slow to high speed positions, spring means connected to said second lever adapted substantially to balance said torque in all positions of adjustment, frictional means opposing manual movement of said manual lever, a serrated rack engageable by said manual lever, and spring means urging said frictional means into engagement and urging said manual lever against said serrated rack.

5. In a wide range governor having a movable adjusting member subjected at increased speed settings of said governor to continuously increasing effort, means for moving said adjusting member comprising a lever and a link interconnecting said lever and said member and constructed and arranged to change said continuously increasing effort as applied to said member to a torque applied to said lever which first increases and then decreases upon movement of said lever from slow to high speed positions, and a balance spring connected to said lever and positioned to apply a balancing torque thereto which first increases and then decreases on movement of said lever from low speed to high speed position.

6. In a wide range governor having an adjusting lever subjected at increased speed settings of said governor to continuously increasing torque, means for moving said lever comprising a manual lever and a link interconnecting said levers and constructed and arranged to change said continuously increasing torque as applied to said adjusting lever to a torque applied to said manual lever which first increases and then decreases upon movement of said manual lever from slow to high speed positions, and a balance spring connected to said second lever and positioned to apply a balancing torque thereto which first increases and then decreases on movement of said lever from low speed to high speed position.

7. In a wide range governor having an adjusting lever subjected at increased speed settings of said governor to continuously increasing torque, means for moving said lever comprising a manual lever and a link interconnecting said levers and constructed and arranged to change said continuously increasing torque as applied to said adjusting lever to a torque applied to said manual lever which first increases and then decreases upon movement of said manual lever from slow to high speed positions, and a balance spring connected to said manual lever and positioned such that upon movement of said manual lever from low speed position to high speed position, the tension of said spring decreases first slowly and then more rapidly, while the effective torque arm of said spring increases first rapidly and then more slowly, whereby to apply a balancing torque to said manual lever which first increases and then decreases by substantial amounts.

HERMAN G. ADLER.